(12) United States Patent
Holden et al.

(10) Patent No.: US 8,672,472 B2
(45) Date of Patent: Mar. 18, 2014

(54) MEANS FOR CONTROLLING THE PROGRESSION OF MYOPIA

(75) Inventors: Brien Anthony Holden, Kingsford (AU); Arthur Ho, Coogee (AU); Padmaja Rajagopal Sankaridurg, Marboubra (AU); Thomas Arthur Aller, Albany, CA (US); Earl Leo Smith, III, Houston, TX (US)

(73) Assignee: Vision CRC Limited, Kensington, NSW (AU)

( * ) Notice: Subject to any disclaimer, the term of this patent is extended or adjusted under 35 U.S.C. 154(b) by 0 days.

(21) Appl. No.: 13/548,018

(22) Filed: Jul. 12, 2012

(65) Prior Publication Data

US 2013/0010255 A1 Jan. 10, 2013

Related U.S. Application Data

(63) Continuation of application No. 11/758,441, filed on Jun. 5, 2007, now Pat. No. 8,240,847.

(30) Foreign Application Priority Data

Jun. 8, 2006 (AU) ............................. 2006903112

(51) Int. Cl.
G02C 7/04 (2006.01)
(52) U.S. Cl.
USPC ................................. 351/159.02; 351/159.79
(58) Field of Classification Search
USPC ............ 351/159.02, 159.05–159.07, 159.22, 351/159.4, 159.74, 159.79
See application file for complete search history.

(56) References Cited

U.S. PATENT DOCUMENTS

| 3,726,587 A | 4/1973 | Kendall |
| 3,933,411 A | 1/1976 | Winner |

(Continued)

FOREIGN PATENT DOCUMENTS

| EP | 1262815 A2 | 12/2002 |
| WO | 2005/055891 | 6/2005 |

(Continued)

OTHER PUBLICATIONS

Williams, D. R. et al., "Off-axis Optical Quality and Retinal Sampling in the Human Eye," *Vision Research*; 36(8), Pergamon Press, Oxford, GB Apr. 1996, 1103-1114.

(Continued)

*Primary Examiner* — Darryl J Collins
(74) *Attorney, Agent, or Firm* — Morgan, Lewis & Bockius LLP

(57) ABSTRACT

A contact lens (10) for use in controlling or retarding the progression of myopia in an eye has a central optical zone (20) approximating the normal diameter of the pupil of the eye (22) that gives clear central vision at distance for the wearer. An annular peripheral optical zone 24 that is substantially outside the diameter of the pupil is formed around the central optical zone (20) with greater refractive power than that of the central zone (22) so that oblique rays entering the eye through the peripheral optical zone (24) will be brought to focus at a focal plane that is substantially on or anterior to the peripheral region of the retina. Preferably, the rear surface (16) of the lens is shaped to conform to the cornea of the eye and the front surface (18) of the lens (10) is shaped to provide—in conjunction with the rear surface (16)—the desired optical properties of the central and peripheral optical zones. The front surface (18) is also preferably contoured to form a smooth transition (30) between the junction of the central optical zone (20) and the peripheral optical zone (24), with or without designed optical properties such as progressive power.

35 Claims, 5 Drawing Sheets

(56) References Cited

U.S. PATENT DOCUMENTS

| | | |
|---|---|---|
| 4,418,991 A | 12/1983 | Breger |
| 4,525,043 A | 6/1985 | Bronstein |
| 5,526,071 A | 6/1996 | Seidner et al. |
| 5,574,518 A | 11/1996 | Mercure |
| 5,684,560 A | 11/1997 | Roffman et al. |
| 6,045,578 A | 4/2000 | Collins et al. |
| 6,244,709 B1 | 6/2001 | Vayntraub et al. |
| 6,752,499 B2 | 6/2004 | Aller |
| 7,025,460 B2 | 4/2006 | Smitth et al. |
| 2005/0041203 A1 | 2/2005 | Lindacher et al. |
| 2006/0082729 A1 | 4/2006 | To et al. |

FOREIGN PATENT DOCUMENTS

| | | |
|---|---|---|
| WO | 2006/004440 | 1/2006 |
| WO | 2007/041796 | 4/2007 |

OTHER PUBLICATIONS

PCT Written Opinion Issued in PCT/US2007/070419 On Jan. 7, 2008.

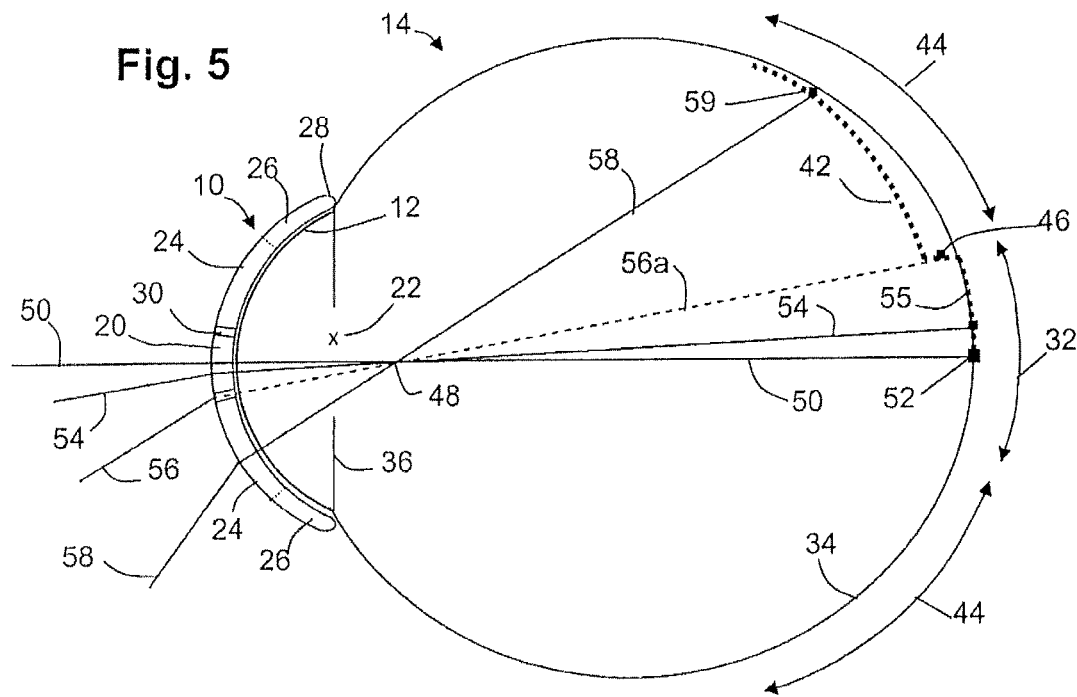
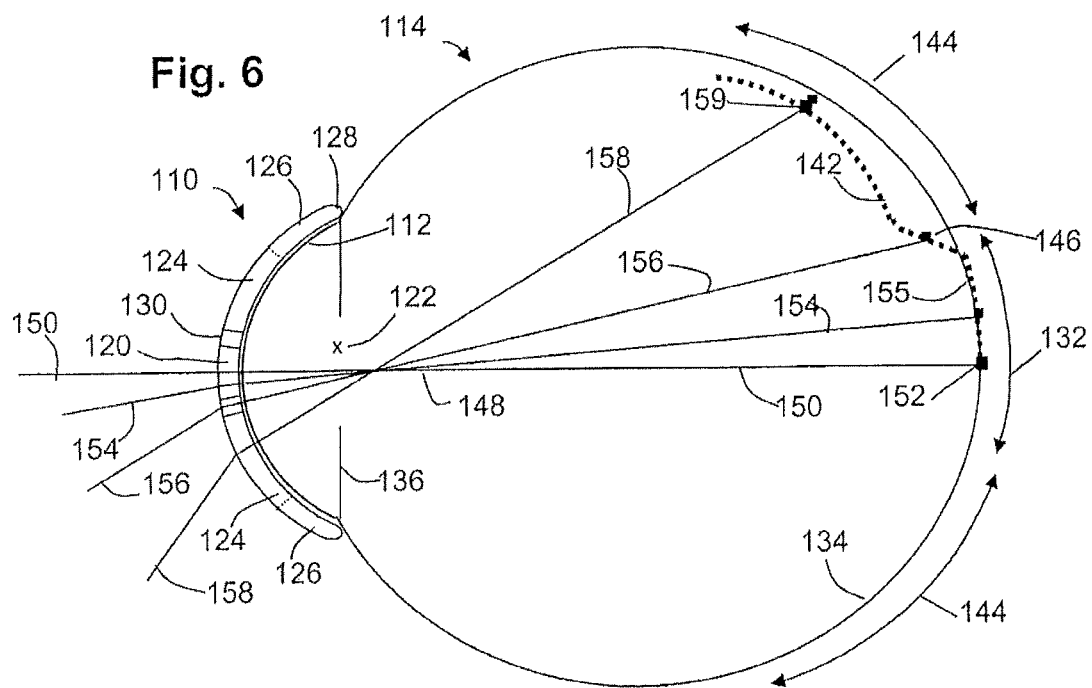

MEANS FOR CONTROLLING THE PROGRESSION OF MYOPIA

CROSS-REFERENCE

This application is a continuation of U.S. application Ser. No. 11/758,441, filed Jun. 5, 2007, now U.S. Pat. No. 8,240,847 which claims benefit of priority from commonly assigned Australian provisional patent application No. 2006903112 filed Jun. 8, 2006, the contents of which are incorporated herein by reference in its entirety.

FIELD OF THE INVENTION

The present invention relates to means, including methods and contact lenses, suitable for use in controlling or reducing the progression of myopia, particularly though not solely, in the young person.

More particularly, this invention concerns the use of multi-zone, non-multi-focal contact lenses in the treatment of myopia. It represents a novel and unobvious advance over commonly assigned U.S. Pat. No. 7,025,460 by Smith et al., (hereafter "Smith").

It is understood that a multi-zone contact lens is one where different portions or areas of the lens have different optical properties or functions, most usually different refractive powers or aberration correction functions. Multi-focal contact lenses are a sub-class of multi-zone contact lenses characterized by the fact that the central portion of the lens, corresponding roughly to normal pupil diameter, has at least two zones of different refractive power. Usually this is to provide the wearer, simultaneously, with both distance and near vision and, possibly, with a transition zone providing transition power between the distance and near vision powers. Thus a multi-zone, non-multi-focal lens is one where the central portion of the lens does not include multi-zones that provide multiple foci on the central retina.

BACKGROUND OF THE INVENTION

Myopia or short-sightedness is a problem of the eye wherein objects at a distance are focused in front of the retina, causing blurred vision; that is, the focusing power of the eye is too great. Myopia is normally corrected with the use of ophthalmic lenses of sufficient negative power to bring distant objects back into focus on the central retina, while allowing near objects to be focused on the central region of the retina by accommodation of the lens of the eye. Myopia is commonly a progressive disorder associated with gradual elongation of the eye so that lenses of increasing negative power are needed over time. A number of undesirable pathologies are associated with progressive myopia.

It is now generally accepted that elongation of the eye of a growing animal is normally controlled by a feedback mechanism that enables axial light rays entering the eye to be focused onto the central region of the retina, It is assumed that, with emmetropia, this mechanism works well but that, in myopia, the elongation is excessive while, in hyperopia, it is insufficient to allow good focus of the axial rays. Until the recent work of Smith and others (discussed in part in the aforementioned U.S. Pat. No. 7,025,460, and incorporated by reference herein, as if made a part of the present application), it was commonly accepted that the stimulus controlling the feedback mechanism had to do with features of the central image formed in the eye. Smith has now convincingly shown that the stimulus has little to do with the quality of the central image but is related to the curvature of field or peripheral refraction; that is, the quality of the peripheral image. More particularly, Smith demonstrated that a stimulus for increased eye length is created when the peripheral focal plane lies behind (is posterior to) the retina and that this condition may persist despite excessive and continuing growth of the eye from the standpoint of optimal central vision. Smith therefore proposed the use of corrective eye lenses for myopia that shift the focal plane in front of (anterior to) the peripheral retina. However, the lenses, especially contact lenses, suggested by Smith are difficult to design and manufacture, and may introduce noticeable visual distortion in peripheral vision.

Prior to the teachings of Smith, a variety of multi-focal contact lenses had been proposed on the common assumption that aspects of the eye's central image provide the stimulus for abnormal eye growth in myopia. Though such prior art is not of direct relevance to the present invention, those items considered to be of most interest are reviewed below, U.S. Pat. No. 6,752,499 to Alter teaches prescribing commercially available bifocal contact lenses for young myopic patients who also exhibit near-point esophoria in the hope of controlling the progression of myopia, The preferred lenses were those with concentric near and distance zones within the normal pupil diameter of the patient. Such bifocal contact lenses had been designed and prescribed for the correction of presbyopia in older eyes. However, Aller proposed that they should be prescribed for the selected myopic patients to provide additional refractive power (myopic defocus) at both near and distance. Obviously these lenses have the inherent disadvantage that at least one out of focus axial image is present on the central retina at all times, degrading image quality for both distance and near gaze. Moreover, when the wearer is viewing a near object and the eye is making use of the near zone of the lens, the distance zone not only creates an unwanted and out-of-focus image of the object but, more significantly, portion of this out-of-focus image is likely to be present posterior to the peripheral region of the retina and, according to the teaching of Smith, to thereby provide a stimulus for myopia progression.

U.S. Pat. No. 6,045,578 to Collins et al. (Collins) teaches the addition of positive spherical aberration at the central retina in the hope of providing a stimulus that will reduce or control the progression of myopia on the basis that some positive spherical aberration is normally found in the emmetropic adult eye. This principle is applied to a variety of eye lenses including contact lenses. However, the deliberate introduction of spherical aberration into the central image degrades that image and visual acuity. Collins gives no attention to the nature of the image in the peripheral region of the retina where, as taught by Smith, the essential stimulus for eye growth is provided. Significant trial results using Collins-type lenses with deliberately introduced spherical aberration in the central image for the control of the progression of myopia have not been reported to the applicant's knowledge.

International Patent Application No. WO200604440A2 by Phillips et al. (Phillips) discloses the use of bifocal contact lenses in which there is (i) a vision correction area for correcting the myopic central vision of a wearer and (ii) a myopic defocus area which simultaneously presents a myopic defocused in the wearer's central vision at both near and distance gaze. Since (as is characteristic of multi-focal lenses) both areas of the lens fall within the normal pupil diameter of the patient, the same basic problem of degraded central image is also present here. Similar problems are evident with the teachings of US Patent Application No. 2006/0082729 by To, which discloses the use of multi-focal Fresnel contact lenses that provide myopic defocus in central vision, but they are exacerbated by the fact that Fresnel lenses degrade image quality elative to refractive lenses.

SUMMARY OF THE INVENTION

The present invention provides a multi-zone contact lens for inhibiting the progression of myopia in an eye, a method of forming such a lens, and a method of inhibiting the progression of myopia in an eye by the use of such a lens. The lens basically has a central optical zone that approximates in size the normal pupil diameter of the eye and that has a refractive power selected or adapted to give the eye clear distance vision, and a peripheral optical zone that substantially falls outside the normal pupil diameter of the eye and that has a refractive power sufficient to focus oblique peripheral rays entering the patient's eye through the peripheral zone onto a focal plane located on or in front of the peripheral region of the retina. While such peripheral focus provides the stimulus for reducing elongation of the eye in accordance with the teachings of Smith, two-zone lenses of this type— especially where the peripheral zone is annular and surrounds the central zone—are much more readily and cheaply made than the lenses disclosed in the Smith patent and can potentially introduce less aberrations such as distortion to the peripheral image.

Since axial rays from both distant and near objects essentially pass only through the single-power central zone of the lens, not through more than one focal zone as with conventional bifocal contact lenses, given normal accommodation for near gaze, both distance and near images will be clear. The multi-zone contact lens of the invention is therefore not a bifocal contact lens where the two focal zones overlie the pupil so that both intercept axial rays from every object, whether near or distant. As noted above such bifocal lenses are proposed for myopia treatment by the prior art.

As progressive myopia commonly afflicts children and young adults, the diameter of the central optical zone will usually be greater than about 3 mm and not more than 1 mm less than the normal pupil diameter of the eye. Due to the existence of what is known to vision scientists as the Stiles-Crawford effect, light rays that pass close to the edge (also called "marginal rays") of the pupil of the eye on their way through to the retina, has less visual significance than those rays that travel nearer the centre of the pupil. Thus, the central optical zone need not be precisely greater than the normal pupil diameter of the eye.

On the other hand, it is preferred that the maximum diameter of the central zone should not be more than 1 mm greater than the normal pupil diameter. Where an annular peripheral optical zone is employed, the inner diameter preferably approximates the outer diameter of the central zone and the outer diameter will normally be less than 8 mm, The total diameter of the contact lens will typically lie between 13-15 mm, the additional area being formed by a skirt-like ring or carrier portion that serves to assist in locating and retaining the lens in position on the eye.

As is common with contact lenses, the rear surface is shaped to conform to the shape of the cornea of the patient and the front surface is contoured to create—together with the shape of the rear surface—the desired optical zones with their respective refractive powers. However, with the contact lenses herein envisaged, the difference in refractive power between the central zone and the peripheral optical zone can be as great as 8 Diopters and the discontinuity in shape of the front lens surface at the junction of the central and peripheral zones can be significant. Accordingly, it may be desirable to shape the front of the lens at this junction to form a transition zone which smooths the transition between the shapes of the different zones and/or which provides progressive increase in refractive power in a narrow band between the zones. The purpose of the transition zone, however, is to both smooth the external surface of the lens and to reduce optical artifacts and distortions that may be introduced by a sudden change in refractive power over a short distance. Simply blending or filleting the curves is often sufficient even though it may provide a narrow ring with indeterminate refractive properties.

While it would be ideal for the lenses of the invention to be tailor-made for each eye, it will be generally more practical and economic for the lenses to be mass-produced based upon estimates of the range of normal pupil size (and eye shape) in the population of interest, In practice, therefore some tolerance on the match between normal pupil size for a given patient and the size of the central zone of the lens may be necessary in practice.

More specifically, embodiments of the present invention are directed to a contact lens comprising a central optical zone having a dimension substantially approximating the normal diameter of the pupil of an eye when the lens is worn by a wearer on said eye, said central optical zone having a central zone refractive power adapted to provide the wearer with clear distance vision in a central region of the retina of the eye, and a peripheral optical zone disposed radially outward from said central zone, said peripheral optical zone lying substantially outside the normal diameter of the pupil of the eye when the lens is worn by the wearer, said peripheral optical zone having a peripheral optical zone refractive power that is greater than said central optical zone refractive power by an amount sufficient to focus off-axis rays that enter the eye through said peripheral optical zone when the lens is worn onto points on or anterior to a peripheral region of the retina located around said central region of the retina.

According to further embodiments of the present invention, the contact lens of the present invention have central optical zone and peripheral optical zone having differently curved adjoining front surfaces, and a transition zone formed between said adjoining front surfaces, said transition zone shaped to smoothly blend said adjoining differently curved front surfaces of said central optical zone and said peripheral optical zone. The transition zone preferably further provides a gradation of refractive power between the refractive power of the central optical zone and the refractive power of the peripheral optical zone.

Still further, according to embodiments of the present invention, the present invention is directed to a contact lens for use in reducing the progression of myopia in an eye of a wearer comprising a transparent material having front and rear surfaces, wherein the rear surface provides a base-curve adapted to fit the eye; and wherein the front surface comprises; a central optical zone curved so that, together with the base-curve, said central optical zone produces a central optical zone refractive power adapted to provide the wearer with clear distance vision in a central region of the retina of the eye, the central optical zone being substantially circular in shape of at least 3 mm in diameter but not more than 1 mm less than the normal diameter of the pupil of the eye; and an annular peripheral optical zone surrounding said central zone and curved so that, together with the base-curve, said peripheral zone is adapted to produce a peripheral optical zone refractive power, when the lens is worn, that is greater than said central optical zone refractive power by an amount greater than 1 Diopter and sufficient to focus off-axis rays that enter the eye through said peripheral zone onto a focal plane that is substantially on, or anterior to, the retina in a peripheral region of the retina located around said central region.

Still further, embodiments of the present invention are directed to a method for forming a contact lens for reducing the progression of myopia in an eye of a wearer, comprising forming on a transparent material a rear surface comprising a base-curve that is adapted to fit an eye of a wearer of the lens; and forming on the transparent material, a front surface spaced from said rear surface. The front surface comprises a central optical zone, the dimensions of said central optical zone are selected so the minimum dimension of said central optical zone substantially approximates the normal diameter of the pupil of the eye and that is curved so that, together with the base-curve, said central optical zone generates a central zone refractive power that provides the wearer with clear distance vision in a central region of the retina of the eye, and a peripheral optical zone that surrounds said central optical zone and lies substantially outside the normal diameter of the pupil of the eye, said peripheral optical zone is curved so that, together with the base-curve, said peripheral optical zone generates a peripheral optical zone refractive power that is greater than said central optical zone refractive power by an amount sufficient to focus peripheral rays entering the eye through the peripheral optical zone onto a focal plane that lies on or anterior to a peripheral region of the retina of the eye, when the lens is worn on the eye.

In addition, embodiments of the present invention is directed to methods of inhibiting the progression of myopia in an eye, the method comprising the steps of providing a multi-zone contact lens for the eye which has a central optical zone with a central optical zone refractive power and a peripheral optical zone with a peripheral optical zone refractive power disposed radially from said central optical zone, selecting said central zone refractive power to provide clear central vision to the eye, and selecting a peripheral optical zone refractive power that is greater than the central optical zone refractive power, the peripheral optical zone refractive power being selected to ensure that off-axis rays entering the eye through said peripheral optical zone are brought to focus at points on or anterior to the peripheral retina of the eye, and selecting the size of the central optical zone to be greater than approximately the normal pupil diameter.

Having provided an outline of the invention, examples will now be described with reference to the accompanying drawings. It will be appreciated, however, that many variations to the chosen examples and many other examples of the application of the invention are possible without departing from the scope of the invention set out in the following claims.

BRIEF DESCRIPTION OF THE DRAWINGS

FIG. 5 is a diagrammatic sectional elevation of a human eye fitted with the multi-zone contact lens of the first example (FIGS. 1A and 1B) showing the focal plane for the central and peripheral retina generated by the zones of the lens.

FIG. 6 is a diagrammatic sectional elevation of a human eye fitted with the multi-zone contact lens of the second example (FIGS. 2A and 2B) showing the focal plane for the central and peripheral retina generated by the zones of the lens of the second example.

DETAILED DESCRIPTION OF THE INVENTION

Figure 1A:
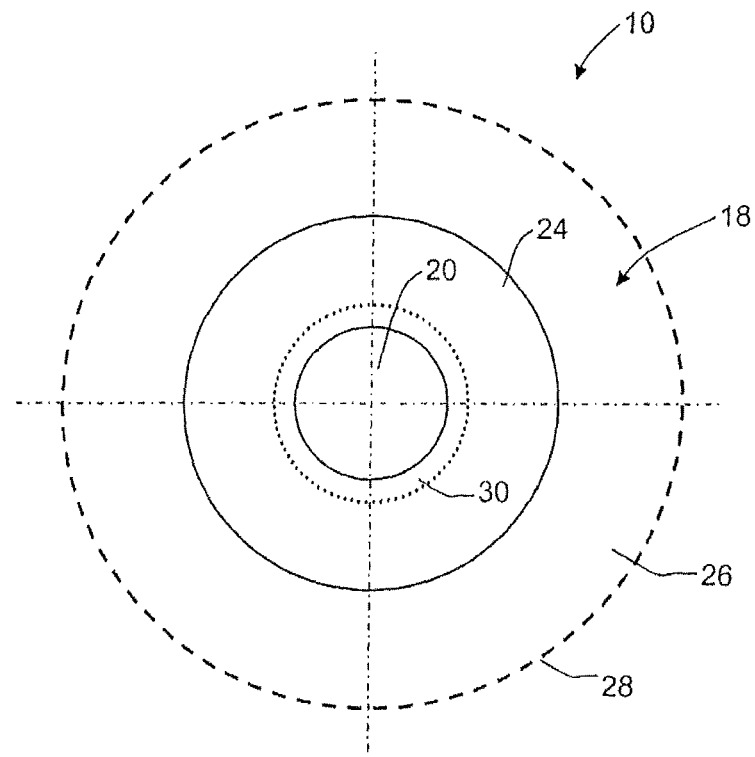
FIG. 1A is a front elevation of a first example of a multi-zone contact lens formed in accordance with the teaching of the present invention, the plane of the lens being assumed to be vertical, as if it is being worn.
Figure 1B:
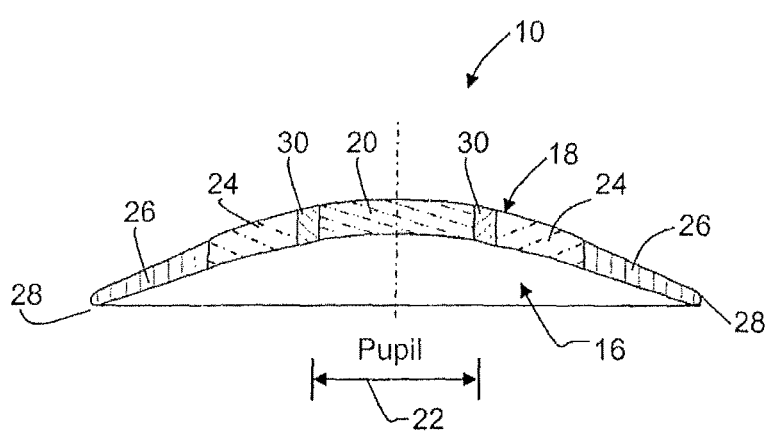
FIG. 1B is a sectional plan view of the contact lens of FIG. 1A hatched to indicate functionally different zones of the lens, rather than physically different portions.

The first example of a contact lens (generally indicated at 10) formed in accordance with one embodiment of the present invention will now be described making reference to the lens drawings of FIGS. 1A and 1B, the refractive power diagram of FIG. 3 and the sectional eye diagram of FIG. 5 that shows lens 10 in place on the cornea 12 of a myopic human eye 14. As is conventional, lens 10 is molded from a homogeneous transparent plastic material with a selected refractive index, so as to have a rear curved surface 16 that is matched to the shape of cornea 12 of eye 14 and a front curved surface 18. In this case, however, front surface 18 is shaped so that, in combination with the shape of rear surface 16, two optical zones are provided; namely, (i) a central circular optical zone 20 that is substantially equal to, or, in other words, substantially approximates the diameter of a normal pupil (indicated at 22 in FIGS. 1B and 5) of eye 14, and (ii) an annular peripheral optical zone 24 surrounding central zone 20 that lies substantially outside the normal diameter of the pupil 22. In addition, front and rear surfaces 18 and 16 are shaped to form a tapering annular carrier portion 26 terminating in a thin edge 28, carrier portion 26 being designed to assist in retaining lens 10 centrally on eye 14 during use, rather than for its optical properties. The design and use of such peripheral carrier portions in contact lenses is well known in the art. Finally, front surface 18 is shaped to provide a smooth transition zone 30 between optical zones 20 and 24 that, in this example, does not perform an optical function but merely blends the adjoining edges of optical zones 20 and 24 for user comfort. The width of ring-like transition zone 30 is exaggerated for the sake of illustration in FIGS. 1A and 1B. Again, it is to be noted that the different hatching patterns in the section drawing of FIG. 1B are intended to show regions of lens 10 that perform different functions and not to suggest that these zones are formed by different physical materials. For purposes of this application, it is understood that the terms central zone and central optical zones are used interchangeably. Similarly, the terms peripheral optical zone and peripheral zone are used interchangeably as would be readily understood by one skilled in the field of lens design and manufacturing.

In central optical zone 20, the combined shape of front and rear surfaces 18 and 16 of lens 10 provides the refractive power needed to match the refractive status at distance for myopic eye 14 and the diameter of central zone 20 is substantially matched to the normal pupil size so that a single clear distance image is formed on the central region 32 of the retina 34 (FIG. 5). However, it will be appreciated that precise matching of central optical zone 20 to normal pupil size may not be practicable or desirable for a number of reasons. First, measurement of normal pupil size may vary somewhat between practitioners and instruments and actual pupil size will normally vary in accordance with environmental lighting. Second, the demands of volume lens production may mean that only a few standardized central zone diameters are offered; these being based on the average pupil sizes for the human population concerned, such as, for example, in this case, young people. Third, if upon examination, it is found that there is a significant difference between or displacement of the visual and optic axes in the subject eye, it may be preferable to select a central optical zone 20 that is slightly larger than pupil diameter 22, to ensure optimum central vision. Fourth, it may also be desirable to select a larger central zone to allow a wider field of view to suit certain vocational requirements. For example, an athlete, or otherwise active person may prefer a wider distance zone to reduce image disturbance. Of course, as is common in the art, the prescription can be further adjusted to suit the individual eye by specifying toric shaping on the front and/or rear surface of the lens to correct astigmatism. And fifth, it is known that due to the presence of the Stiles-Crawford effect, light rays that pass close to the edge (also called "marginal rays") of the pupil of the eye on their way through to the retina, is of less visual significance than those rays that travel nearer the centre of the pupil. Thus, with respect to vision, the marginal portion within the pupil is not of as great an importance as the more central portion of the pupil.

It will be appreciated that the central optical zone of this invention need not be circular in shape. Depending on the individual for whom the lens will be prescribed, there are advantages in selecting a non-circular shape for the central optical zone. Examples for when this may be particularly advantageous include (but are not limited to) cases when the lens does not lie concentric with the pupil of the eye, which may be caused by an eccentrically positioned pupil, or when the lens does not position itself centrally on the cornea, which may be due to asymmetry in the geometry of the cornea or eye-lid influences on the lens. Other examples of when a non-circular shape would be beneficial for the central optical zone include cases when the individual may prefer a horizontally wider field of clear vision (e.g, for driving). Non-circular shapes may be of any geometrical description including ellipses or 'pear-shaped'. In such non-circular central optical zone designs, a key geometrical parameter is the minimum dimension of the non-circular shape (e.g. for an ellipse, it is the narrower 'width', i.e. the length of the minor-axis of the ellipse) to ensure correct sizing of the central zone relative to the normal pupil diameter. For similar reasons, the shape and size of the surrounding peripheral zone also need not be circular. For purposes of this application, it will be understood that the term "dimension" refers to size and shape, as would be readily understood by one skilled in the field of lens design.

In any event, it is generally desirable, in accordance with embodiments of the present invention, for the central zone 20 to lie substantially, if not entirely within, the normal pupil diameter and for the peripheral zone 24 to lie substantially, if not entirely outside, the normal pupil diameter, when viewed directly from the front. It will be appreciated that such an orientation in accordance with embodiments of the present invention, is in direct contradistinction with the disclosures of the prior art mentioned above. It might also be noted that this desirable arrangement will normally be facilitated by the interposition of transition zone 30 between central zone 20 and peripheral zone 24, since the transition zone effectively enlarges the inner diameter of the peripheral zone.

Figure 3:
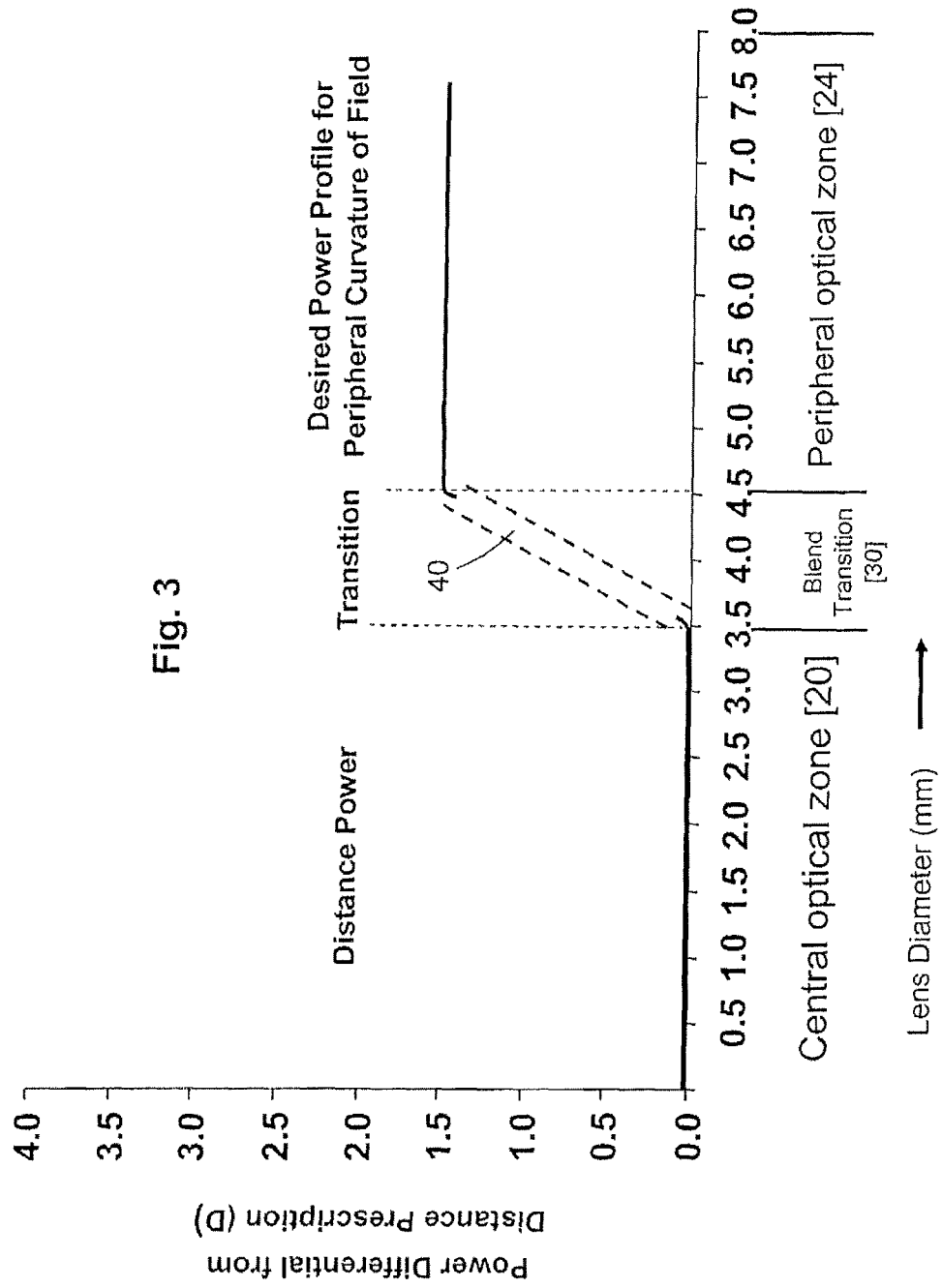
FIG. 3 is a graph of relative optical power with respect to lens diameter for the optical zones of the contact lens of the first example shown in FIGS. 1A and 1B.

The optical properties of lens 10 of the first example are further illustrated by FIG. 3 and its effect on eye 12 is indicated in FIG. 5. In FIG. 3, the relative refractive power of lens 10 is plotted against lens diameter with the distance power of central zone 20 arbitrarily set at zero. Thus, in this example, the diameter of central zone 20 (which is the normal pupil diameter 22 of eye 12) is 3.5 mm, and the inner and outer diameters of the peripheral zone are 4.5 mm and 8 mm, respectively, making the width of the transition zone 30 about 0.5 mm. It will be seen that the refractive power of central zone 20 is substantially uniform, there is a sharp increase in refractive power of 1.5 D over transition zone 30 and that, in contrast to the teachings of Smith, the refractive power of peripheral zone 24 remains substantially constant across its diameter. The sharp increase in refractive power within transition zone 30 is notionally indicated by sloping broken lines 40 because, in this example, power within this narrow zone will not normally be precisely controllable. As previously indicated, front surface 18 of lens 10 in transition zone 30 is not shaped to provide a graded or progressive power transition, but merely to blend or smooth the discontinuity at the junction of the different profiles of optical zones 20 and 24.

As will be seen from FIG. 5, the step increase of 1.5 D in peripheral zone 24 is chosen because it is sufficient (for subject eye 14) to shift the focal plane 42 in the peripheral region 44 of retina 34 anterior to the peripheral retina 44 in order to provide the stimulus needed to inhibit eye elongation and myopia progression, according to the teachings of Smith. The 'anterior step' in the focal plane which occurs in transition zone 30 of lens 10 is indicated at 46 but, as previously noted, the shape or slope of this step is not optically controlled in this example and its depiction is notional. Embodiments of the present invention realize an important improvement over Smith by obviating the need to figure peripheral optical zone 24 of lens 10 to provide increasing refractive power from the center to the periphery of the retina in general, or across peripheral optical zone 24 in particular.

FIG. 5 shows a number of light rays entering eye 14 from below through lens 10, cornea 12 and pupil 22, the diameter of which is determined by the iris 36. These rays notionally pass through a nodal point 48 within the natural lens of the eye, the natural lens not being depicted for the sake of clarity. Also for the sake of clarity, a similar set of rays entering the eye from above and from nasal and temporal sides are not depicted since they will essentially duplicate those illustrated. It is assumed that an axial ray 50 will be coincident with both the visual and optical axes of eye 12, that lens 10 is centered on cornea 12 so that ray 50 will be brought to focus on the fovea 52 of retina 34. Off-axis rays 54 passing obliquely through central portion 20 of lens 10 will be substantially focused on central region 32 of retina, bringing distant objects into sharp focus thereon, leaving near objects to be focused by accommodation of the natural lens. Thus, by virtue of the prescribed refractive power of central zone 20 of lens 10, virtually all rays from distant objects passing into the eye through central optical zone 20 will be brought to sharp focus on central region 32 of retina to form an image as indicated by dotted line 55.

More oblique off-axis rays such as 56 that pass through transition zone 30 of lens 10 might notionally be conceived to create anterior step 46 of focal plane 42, but, as already indicated above, transition zone 30 is not optically designed and ray 56 is likely to be dispersed in an unfocused manner within eye 12. However, here again, the purely notional path of such a ray is depicted by broken line 56a. Peripheral ray 58, which is more oblique than ray 56 and much more oblique than off-axis ray 54, will pass through peripheral optical zone 24 of lens 10 and be directed close to the edge of iris 36 (i.e., close to the outside margin of pupil 22), by virtue of the greater refractive power of zone 24, be brought to a focus at point 59 on peripheral focal plane 42 that lies in front of (anterior to) peripheral region 44 of retina 34 to provide the desired inhibitory stimulus for eye growth. As will be seen from an inspection of FIG. 5, peripheral rays entering eye 12 at peripheral angles between rays 56 and 58 will be brought to focus in front of retina 34 along focal plane 42, with rays that are less oblique being brought to focus further in front of retina 34 in a manner that provides a strong stimulus for the retardation of eye elongation.

Figure 4:
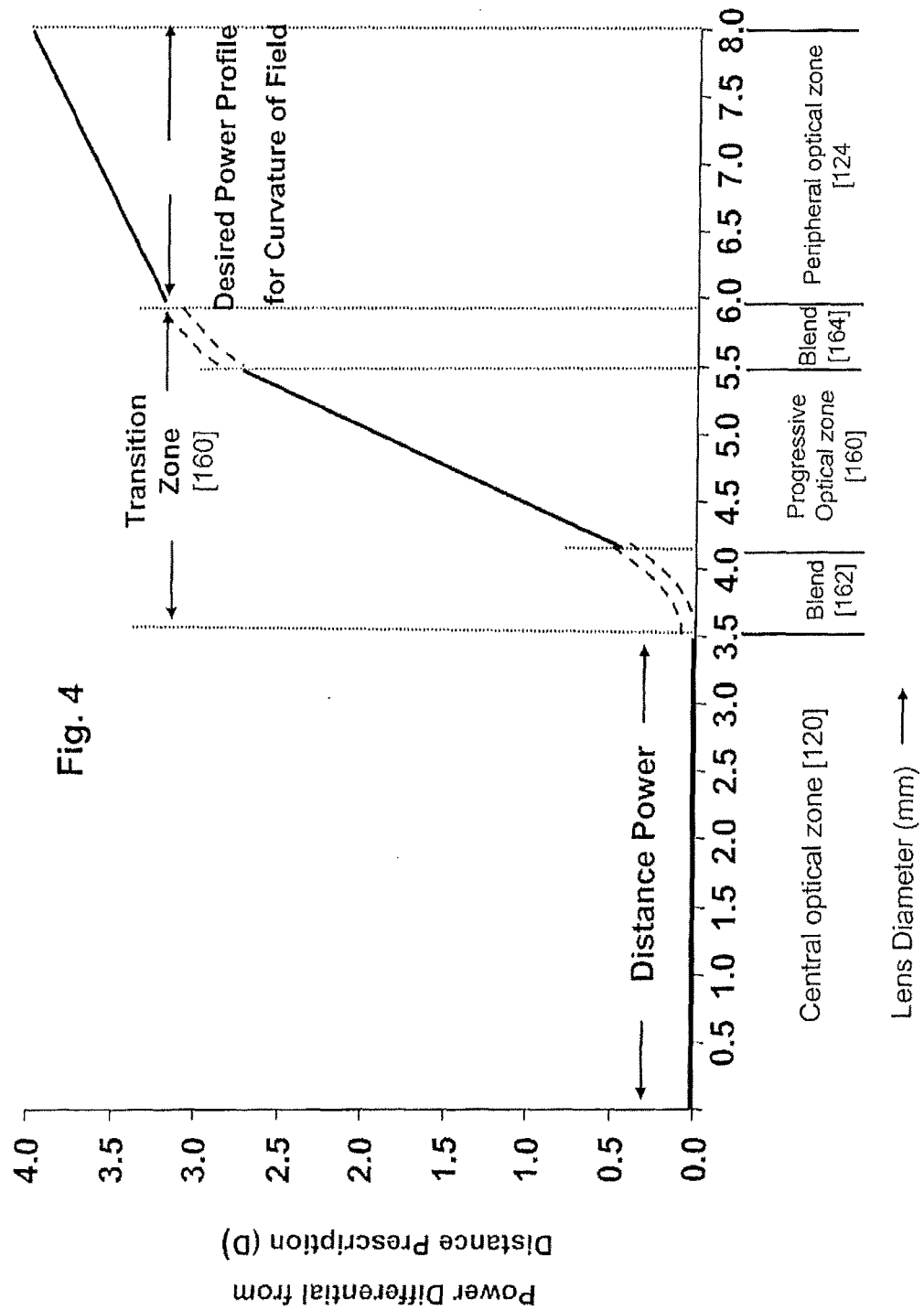
FIG. 4 is a graph of relative optical power with respect to lens diameter for the optical zones of the contact lens of the second example shown in FIGS. 2A and 2B.

The second example of the invention will now be described with reference to the lens drawings of FIGS. 2A and 2B, the corresponding power graph of FIG. 4 and the corresponding eye diagram of FIG. 6. Since, as a brief inspection of these Figures will indicate, the first and second examples share many common features, the same reference numerals will be used for the elements of the second example that have the same or a similar function to those of the first example, except that the prefix '1' will be added. Thus, 110 and 114 indicate the lens and the subject eye of the second example, while the central optical zone, transition zone and peripheral optical zone are respectively indicated by 120, 130 and 124. By indicating similar elements and functions in this way, the description of the second example can be usefully abbreviated.

The principal differences between the first and second examples lie in the design of the transition zone 130 and peripheral zone 124 of lens 110. As will be seen from the power curve of FIG. 4, that the diameter of central optical zone 120 is about 3.5 mm, indicating the normal pupil diameter 122 of eye 112 is about the same as that of eye 12 of the first example. However, the width of transition zone 130 of lens 100 of the second example is 1.25 mm so to allow some control over the optical design of this zone. This means that annular peripheral zone 124 is narrower in this example, having an inner diameter of about 6 mm but essentially the same outer diameter (about 8 mm) as zone 24 of lens 10. Despite narrower peripheral zone 124, the inner refractive power of zone 124 is not only greater than that of zone 24 of lens 10 (2.5 D compared with 1.5 D relative to the power of the central zone) but it increases significantly outwardly toward carrier portion 126. This design is intended to enhance the stimulus that inhibits eye growth by increasing the average amount by which peripheral focal plane 142 of eye 112 is shifted anteriorly.

Figure 2A:
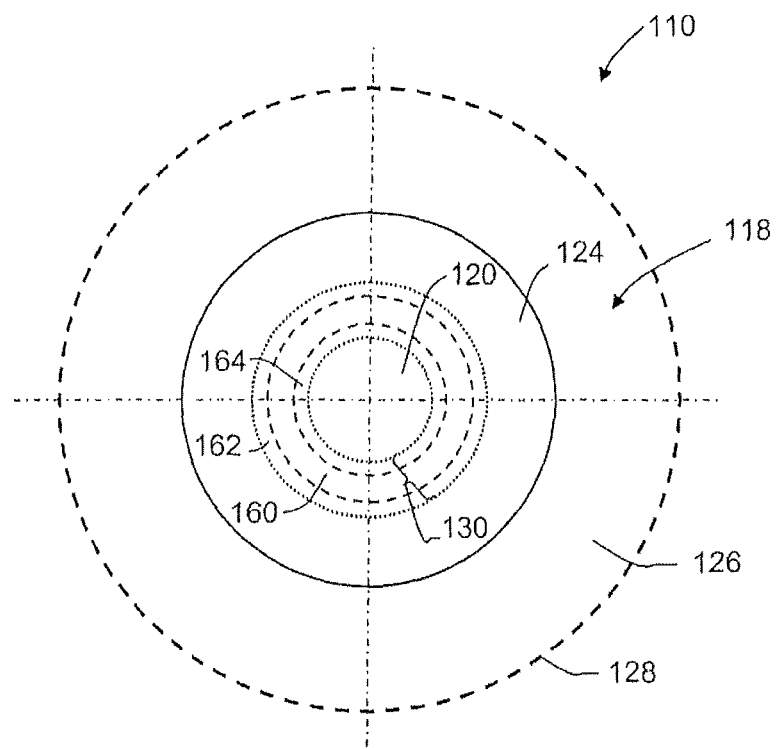
FIG. 2A is a front elevation of a contact lens comprising the second example of multi-zone contact lens formed in accordance with this invention.
Figure 2B:
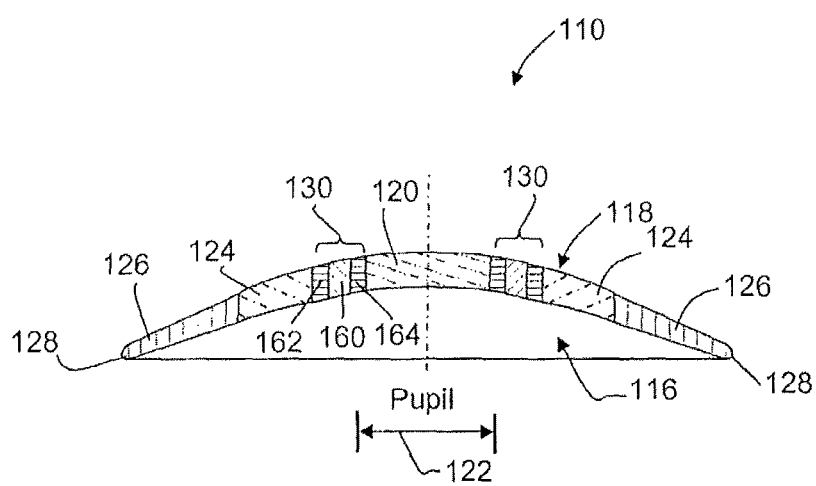
FIG. 2B is a sectional plan view of the lens of FIG. 2A hatched to indicate functionally different zones of the lens, rather than physically different portions.

As will be seen from FIGS. 2A, 2B and 6, transition zone 130 includes a progressive focus zone 160 with a first blend zone 162 between it and the central optical zone 120 and a second blend zone 164 between it and peripheral optical zone 124. As in the first example, blend zones 162 and 164 are not intended to have an optical function but, rather to simply form smooth curves between progressive zone 160 and the central optical zone 120 on the one side and between the progressive zone and the peripheral optical zone 124 on the other. This allows for a substantially linear increase of refractive power in progressive zone 160 as indicated by portion 164 of the power curve of FIG. 4 and for corresponding certainty about the path of rays such as 156 (now shown in an unbroken line) that pass through zone 160 to define the shape of step 146 between the central and peripheral regions 132 and 142 of the focal plane of retina 134. Again, it is preferable that lens 110 has a rear surface 116 that is shaped to fit comfortably on the cornea 112 of the patient and that the desired levels of refractive power in central optical zone 120, progressive optical zone 160 and peripheral optical zone 124 are obtained by figuring the front surface 118 of lens 110.

In the second example it is assumed that, upon examination, it is not only found that eye 112 is myopic in that the focus for central vision lies in front of the retina 134 but it is determined that, in the peripheral region of the retina 144, the eye exhibits strong hyperopia in that the focus in this region is well behind the retina. Thus, even though the degree of central vision myopia may be the same as for eye 12 of the first example requiring the same prescription to correct central vision so that focus for distance is brought onto central region 132 of retina 134, it is highly likely that myopia is more strongly progressive in eye 112 so a stronger prescription is required for peripheral vision in order to bring the focal plane 142 well in front of retina 134 in peripheral region 144. As before, paraxial rays such as 150 are assumed to follow the optical axis of eye 120 and to be brought to focus at fovea 152, oblique rays like 154 passing through central optical zone 120 will be brought to focus on 134 to form a focal plane 155 on central region 132 of the retina to provide excellent distance vision, and oblique peripheral rays such as 158 that pass through peripheral optical zone 124 will be brought to focus on focal plane 142 that is located anterior to the peripheral region 144 of the retina 134.

While the present invention has been described in detail with reference to specific embodiments thereof, it will be apparent to one skilled in the field that various changes, modifications and substitutions can be made, and equivalents employed without departing from, and are intended to be included within, the scope of the claims.

We claim:

1. A method of providing a multi-zone contact lens for an eye, comprising:
   identifying an eye of a person for which progression of myopia is to be addressed, and for that eye:
      providing a multi-zone contact lens for the eye which has a central optical zone with a central optical zone refractive power and a peripheral optical zone with a peripheral optical zone refractive power disposed radially from said central optical zone; selecting said central zone refractive power to provide clear central vision to the eye;
      selecting a peripheral optical zone refractive power that is greater than the central optical zone refractive power, the peripheral optical zone refractive power being selected to ensure that off-axis rays entering the eye through said peripheral optical zone are brought to focus at points on or anterior to the peripheral retina of the eye; and
      selecting the size of the central optical zone to be within approximately 1 mm of a normal pupil diameter for the eye.

2. The method of claim 1, wherein selecting the size of the central optical zone further comprises the selection of a central optical zone size to be at least 3 mm.

3. The method of claim 2, further comprising;
   selecting the peripheral optical zone refractive power to be at least approximately 1 Diopter greater than the refractive power of the central optical zone.

4. The method of claim 2, wherein selecting the refractive power of the peripheral optical zone further comprises the selection of a refractive power of the peripheral optical zone to be between approximately 2.5 Diopters to 8 Diopters greater than the refractive power of the central optical zone.

5. The method of claim 1, further comprising;
   selecting the peripheral optical zone refractive power to be at least approximately 1 Diopter greater than the refractive power of the central optical zone.

6. The method of claim 5, wherein selecting the refractive power of the peripheral optical zone further comprises the selection of a refractive power of the peripheral optical zone to be between approximately 2.5 Diopters to 8 Diopters greater than the refractive power of the central optical zone.

7. The method of claim 1, wherein selecting the refractive power of the peripheral optical zone further comprises the selection of a refractive power of the peripheral optical zone to be between approximately 2.5 Diopters to 8 Diopters greater than the refractive power of the central optical zone.

8. A contact lens kit comprising:
a pair of contact lenses designated for simultaneous use on the eyes of a person with myopia to provide multi-zone, non-multifocal lenses for the eyes, each contact lens comprising:
a central optical zone having a size within approximately 1 mm of a normal diameter of a pupil of an eye to which the contact lens is configured to be applied, said central optical zone having a central zone refractive power adapted to provide the wearer with clear vision in a central region of the retina of the eye; and
a peripheral optical zone disposed radially outward from said central zone, said peripheral optical zone lying substantially outside the normal diameter of the pupil of the eye, said peripheral optical zone having a peripheral optical zone refractive power that is greater than said central optical zone refractive power by an amount sufficient to focus off-axis rays that enter the eye through said peripheral optical zone when the lens is worn onto points on or anterior to a peripheral region of the retina located around said central region of the retina.

9. The contact lens kit according to claim 8, wherein:
the peripheral optical zone refractive power is at least approximately 1 Diopter greater than the central optical zone refractive power.

10. The contact lens kit according to claim 9, wherein:
the dimensions of the central optical zone are selected so the minimum dimension of said central optical zone is at least 3 mm.

11. The contact lens kit according to claim 10, further comprising:
a transition zone between said central optical zone and said peripheral optical zone, said transition zone providing a gradation of refractive power between the refractive power of the central optical zone and the refractive power of the peripheral optical zone.

12. The contact lens kit according to claim 9, wherein:
said central optical zone and said peripheral optical zone have differently curved adjoining front surfaces, and
wherein a transition zone is formed between said adjoining front surfaces and is shaped to smoothly blend said adjoining differently curved front surfaces of said central optical zone and said peripheral optical zone.

13. The contact lens kit according to claim 9, further comprising:
a transition zone between said central optical zone and said peripheral optical zone, said transition zone providing a gradation of refractive power between the refractive power of the central optical zone and the refractive power of the peripheral optical zone.

14. The contact lens kit according to claim 8, wherein:
the peripheral optical zone refractive power is between approximately 2.5 Diopters and 8 Diopters greater than the central optical zone refractive power.

15. The contact lens kit according to claim 14, wherein:
the dimensions of the central optical zone are selected so the minimum dimension of said central optical zone is at least 3 mm.

16. The contact lens kit according to claim 14, wherein:
said central optical zone and said peripheral optical zone have differently curved adjoining front surfaces, and
wherein a transition zone is formed between said adjoining front surfaces and is shaped to smoothly blend said adjoining differently curved front surfaces of said central optical zone and said peripheral optical zone.

17. The contact lens kit according to claim 14, further comprising:
a transition zone between said central optical zone and said peripheral optical zone, said transition zone providing a gradation of refractive power between the refractive power of the central optical zone and the refractive power of the peripheral optical zone.

18. The contact lens kit according to claim 8, wherein:
the dimensions of the central optical zone are selected so the minimum dimension of said central optical zone is at least 3 mm.

19. The contact lens kit according to claim 18, wherein:
said central optical zone and said peripheral optical zone have differently curved adjoining front surfaces, and
wherein a transition zone is formed between said adjoining front surfaces and is shaped to smoothly blend said adjoining differently curved front surfaces of said central optical zone and said peripheral optical zone.

20. The contact lens kit according to claim 8, wherein:
said central optical zone and said peripheral optical zone have differently curved adjoining front surfaces, and
wherein a transition zone is formed between said adjoining front surfaces and is shaped to smoothly blend said adjoining differently curved front surfaces of said central optical zone and said peripheral optical zone.

21. The contact lens kit according to claim 8, further comprising:
a transition zone between said central optical zone and said peripheral optical zone, said transition zone providing a gradation of refractive power between the refractive power of the central optical zone and the refractive power of the peripheral optical zone.

22. A method for forming a multi-zone contact lens for an eye of a person for which progression of myopia is to be addressed, comprising:
forming on a transparent material a rear surface comprising a base-curve that is adapted to the eye; and
forming on the transparent material a front surface spaced from said rear surface and that comprises:
a central optical zone, the dimensions of said central optical zone are selected so the minimum dimension of said central optical zone has a size within approximately 1 mm of a normal diameter of the pupil of the eye and that is curved so that, together with the base-curve, said central optical zone generates a central zone refractive power that provides the wearer with clear distance vision in a central region of the retina of the eye, and
a peripheral optical zone that surrounds said central optical zone and lies substantially outside the normal diameter of the pupil of the eye, said peripheral optical zone is curved so that, together with the base-curve, said peripheral optical zone generates a peripheral optical zone refractive power that is greater than said central optical zone refractive power by an amount sufficient to focus peripheral rays entering the eye through the peripheral optical zone onto a focal plane that lies on or anterior to a peripheral region of the retina of the eye, when the lens is worn on the eye.

23. The method of claim 22, wherein said peripheral optical zone refractive power is at least approximately 1 Diopter greater than said central optical zone refractive power.

24. The method of claim 23, wherein the dimensions of the central zone are selected so the minimum dimension of said central zone is at least 3 mm.

25. The method of claim 23, further comprising:
shaping said front surface to form a ring-like transition zone between said central optical zone and said peripheral optical zone, said transition zone being curved so that, together with the base-curve, a gradation of refractive power is generated between the refractive power of central optical zone and the refractive power of the peripheral optical zone.

26. The method of claim 23, further comprising:
shaping said front surface to form a ring-like transition zone between said central optical zone and said peripheral optical zone, said transition zone being curved so as to smoothly blend the curve of the central optical zone with the curve of the peripheral optical zone.

27. The method of claim 22, wherein said peripheral optical zone refractive power is between approximately 2.5 and 8 Diopters greater than the central optical zone refractive power.

28. The method of claim 27, wherein the dimensions of the central zone are selected so the minimum dimension of said central zone is at least 3 mm.

29. The method of claim 27, further comprising:
shaping said front surface to form a ring-like transition zone between said central optical zone and said peripheral optical zone, said transition zone being curved so that, together with the base-curve, a gradation of refractive power is generated between the refractive power of central optical zone and the refractive power of the peripheral optical zone.

30. The method of claim 27, further comprising:
shaping said front surface to form a ring-like transition zone between said central optical zone and said peripheral optical zone, said transition zone being curved so as to smoothly blend the curve of the central optical zone with the curve of the peripheral optical zone.

31. The method of claim 22, wherein the dimensions of the central zone are selected so the minimum dimension of said central zone is at least 3 mm.

32. The method of claim 31, further comprising:
shaping said front surface to form a ring-like transition zone between said central optical zone and said peripheral optical zone, said transition zone being curved so that, together with the base-curve, a gradation of refractive power is generated between the refractive power of central optical zone and the refractive power of the peripheral optical zone.

33. The method of claim 31, further comprising:
shaping said front surface to form a ring-like transition zone between said central optical zone and said peripheral optical zone, said transition zone being curved so as to smoothly blend the curve of the central optical zone with the curve of the peripheral optical zone.

34. The method of claim 22, further comprising:
shaping said front surface to form a ring-like transition zone between said central optical zone and said peripheral optical zone, said transition zone being curved so that, together with the base-curve, a gradation of refractive power is generated between the refractive power of central optical zone and the refractive power of the peripheral optical zone.

35. The method of claim 22, further comprising:
shaping said front surface to form a ring-like transition zone between said central optical zone and said peripheral optical zone, said transition zone being curved so as to smoothly blend the curve of the central optical zone with the curve of the peripheral optical zone.

* * * * *

UNITED STATES PATENT AND TRADEMARK OFFICE
CERTIFICATE OF CORRECTION

| | | |
|---|---|---|
| PATENT NO. | : 8,672,472 B2 | Page 1 of 1 |
| APPLICATION NO. | : 13/548018 | |
| DATED | : March 18, 2014 | |
| INVENTOR(S) | : Holden et al. | |

It is certified that error appears in the above-identified patent and that said Letters Patent is hereby corrected as shown below:

In the Claims

Claim 22, col. 12, line 54, please delete "distance"; and

Claim 25, col. 13, line 12/13, please delete "of central" and insert --of the central--; and Claim 29, col. 13, line 33/34, please delete "of central" and insert --of the central--.

Signed and Sealed this
Tenth Day of June, 2014

Michelle K. Lee
*Deputy Director of the United States Patent and Trademark Office*